CRYOTRON MEMORY

Filed July 5, 1962 2 Sheets-Sheet 1

INVENTORS
JOHN W. BREMER
OLIVER J. COTEY
BY Samuel E. Turner
ATTORNEY

CRYOTRON MEMORY

Filed July 5, 1962 2 Sheets-Sheet 2

INVENTORS
JOHN W. BREMER
OLIVER J. COTEY
BY
Samuel E. Turner
ATTORNEY

United States Patent Office 3,167,748
Patented Jan. 26, 1965

3,167,748
CRYOTRON MEMORY

John W. Bremer, Sunnyvale, and Oliver J. Cotey, Van Nuys, Calif., assignors to General Electric Company, a corporation of New York Filed July 5, 1962, Ser. No. 207,534
11 Claims. (Cl. 340—173.1)

This invention relates to cryogenic electronic memory devices and particularly to a word organized memory matrix for computer stores having non-destructive readout of the stored information.

Certain electrical conductors are known to exhibit a loss of electrical resistance at supercold temperatures approaching absolute zero and to regain resistance in the presence of a certain "critical" magnetic field. The critical field depends upon the particular superconductive material as well as its temperature. Superconductive materials requiring comparatively high critical magnetic fields are known as "hard" superconductors while those requiring comparatively low critical magnetic fields are known as "soft" superconductors.

Superconductors can be used to form a cryotron or superconductive switch. In the preferred thin-film form the cryotron comprises a gate conductor film of soft superconductive material which is crossed by a narrow control conductor film insulated therefrom and preferably formed of hard superconductive material. Both the gate conductor and the control conductor are thus normally in the superconducting state. If sufficient current is caused to flow through the control conductor the resulting magnetic field causes the gate conductor to become resistive in the region of the crossover.

Because of low heat losses, cryogenic devices of the thin-film form may be greatly miniaturized and many cryotron elements can be contained in a small volume. Thus cryotron elements are well adapted to the formation of large capacity computer memory units.

Cryogenic memory units are now known which comprise a matrix of superconductive loops wherein information is stored by producing persistent circulating currents in selected ones of the superconductive loops. Cryotron elements associated with the superconductive loops control "writing," the establishment of the circulating currents, and "reading," the detection of the circulating currents. An example of such a cryogenic memory is shown by John W. Bremer and Vernon L. Newhouse in copending U.S. patent application No. 47,539, filed August 4, 1960, entitled "Cryogenic Electronic Memory Unit" and assigned to the same assignee as the present invention.

While such a unit can store a large number of bits in a small volume and requires few circuit elements compared to conventional circuitry using, for example, "flip-flop" bistable circuits, it is desirable for purposes of economy and ease and reliability as well as speed of operation to reduce the complexity of the circuitry for writing into and reading from such memory units.

It is therefore an object of the invention to provide an improved memory unit.

It is a more specific object of the invention to provide a cryogenic memory unit having a simplified circuit arrangement.

Another object of the invention is to provide a simple storage circuit wherein an item of information may be stored as a persistent current.

Another object of the invention is to provide a cryogenic memory unit with simplified selection circuitry.

Another object of the invention is to provide an improved word organized cryogenic memory unit with non-destructive readout.

These and other objects of the invention are achieved by providing a simple storage circuit comprising three cryotrons associated with a superconductive loop for storing a persistent current. Writing, that is, the establishment of a persistent current in the storage circuit, is accomplished by applying currents to a digit line and a write line. Reading, that is, the detection of a persistent current in the storage circuit, is accomplished by applying currents to the above-mentioned digit line and to a read line. Thus only three currents are required for both writing and reading.

To form the memory unit a plurality of the storage circuits are arranged in columns and rows. The write and read lines are the row controls for selecting a word while the digit lines form the columns for parallel digit or bit selection.

The structure, organization and operation of the invention is described more specifically in the following detailed description with reference to the accompanying drawings in which.

Figure 1:
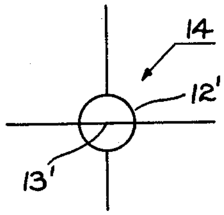
FIGURE 1 is a perspective view of an example of the structure of a thin-film cryotron element together with a schematic symbol thereof.

Shown in FIG. 1 is an example of the structure of the thin-film form of the basic cryotron or superconductive switching element. Thin-film cryotron circuitry is ordinarily formed on a flat base or substrate such as a substrate 10, FIG. 1. The substrate is ordinarily formed of an insulating material having a smooth surface such as glass. In order to decrease circuit inductance it is preferable to provide a superconductive shield plane 11 underlying the cryogenic circuitry. The shield plane 11 may be formed of a thin film of hard superconductive material such as lead. A layer of insulating material such as silicon monoxide (not shown) is formed over the shield plane 11 to insulate the subsequently formed structure therefrom.

The working portions of the cryotron comprise a gate conductor 12, hereinafter referred to as a "gate," which is crossed by a control conductor 13, hereinafter referred to as a "control." The control 13 is insulated from the gate 12 by a film of insulating material such as silicon monoxide. The gate 12 is formed of soft superconductive material such as tin while the control 13 is formed of a hard superconductive material such as lead. Thus the magnetic field resulting from a sufficient current flow in the control 13 causes the gate to become resistive in the region of the crossover while the superconductivity of the hard superconductive material of the control 13 is not destroyed. Thus the cryotron comprises a two state device, that is, the gate is superconductive in the absence of a current in the control and the gate is resistive in the presence of a sufficient current in the control.

Also shown in FIG. 1 is a schematic symbol 14 which is employed to represent a cryotron element. The gate is represented by a circle 12' and the control by a line 13' crossing the circle.

Preliminary to the description of the memory matrix of the invention, the structure and operation of the basic bit storage circuit of the memory will be described.

Figure 2:
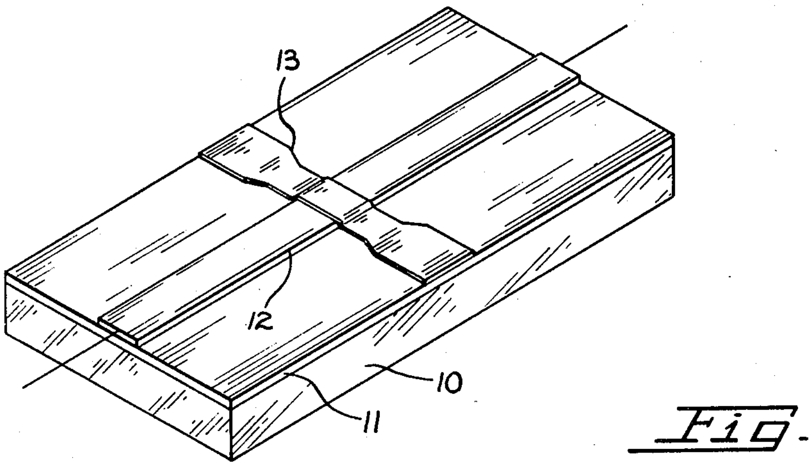
FIGURE 2 is a schematic diagram of the basic storage circuit of the present invention.

The storage circuit, which is shown in FIG. 2, comprises a cryotron controlled superconductive loop in which a persistent current can be established to represent a bit of information. Binary information may thus be stored by the circuit by the presence or absence of the persistent current. In the following description the circuit is considered to be storing a binary "1" when a persistent current is present in the superconductive loop and to be storing a binary "0" in the absence of a persistent current.

Referring to FIG. 2, the storage circuit includes three cryotrons 21, 22 and 23, a branch circuit 20, a digit line, a write line and a read line. A persistent current loop is formed by the branch circuit 20 in parallel with the gate of cryotron 23, the branch circuit 20 including the control of cryotron 22. The persistent current loop provides two parallel paths for a digit current I1 through the digit line, a first path through the gate of cryotron 23 and a second path through the branch circuit 20. Current in the branch circuit 20 is designated a loop current I2. Constant current sources 24 are provided to supply currents for the digit, write and read lines.

Figure 3:
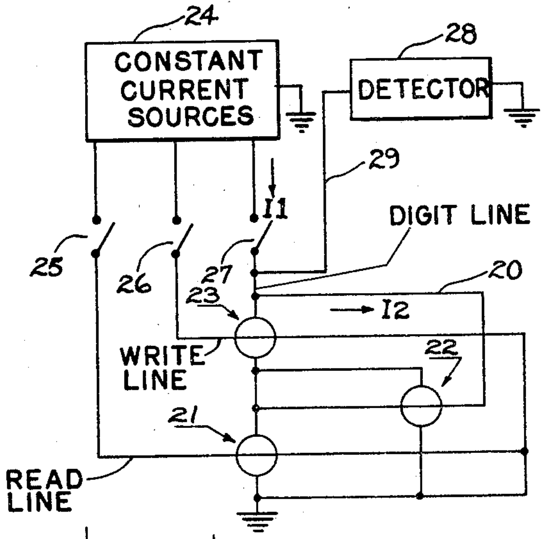
FIGURE 3 is a diagram of waveshapes illustrating the operation of the storage circuit of FIG. 2.
Figure 3:
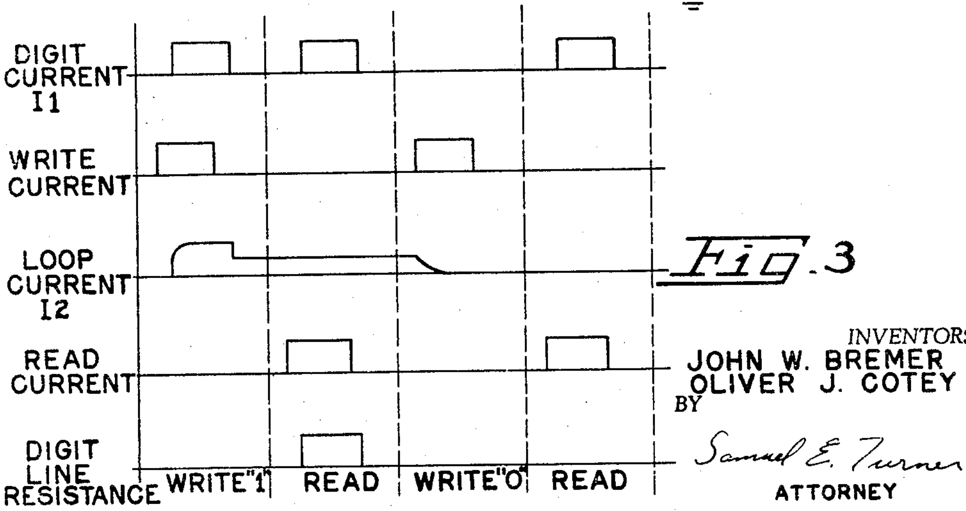

Operation of the storage circuit is shown by the following examples of writing and reading with reference to FIG. 3 which illustrates waveshapes of circuit operation. To write a "1," that is, to store a persistent current in the circuit, a current is applied to the write line by closing a switch 26. The write line is connected to the control of cryotron 23. Thus the magnetic field due to the write current renders the gate of cryotron 23 resistive. The digit current I1 is now applied to the digit line. Since the branch circuit 20 is superconductive while the cryotron 23 is resistive the entire digit current flows through the path provided by the branch circuit as indicated by the first portion of the loop current I2 waveshape in FIG. 3. (The leading edge of the loop current waveshape is shown curved to illustrate the influence of the inductance of branch circuit 20.) The write current is now turned off allowing the loop path through the gate of cryotron to become superconductive. The digit current is then turned off. The stored energy due to the inductance in the branch circuit 20 forces reverse current flow in the path through the now superconductive gate of cryotron 23 and a persistent current is thus established in the loop.

As illustrated by the waveshape of the loop current I2 in FIG. 3, the persistent current established when the digit current I1 is turned off is less than the digit current due to the inductance encountered in the path through the gate of cryotron 23. This persistent current, indicative of a stored "1," will continue to flow indefinitely until a resistance is established in the loop as, for example, when a "0" is stored or written as described hereinafter.

The second column of the diagram of FIG. 3 illustrates a read operation. As illustrated by the waveshape of the loop current, the storage circuit contains a persistent current and is therefore storing a "1." It will also be noted that the stored persistent current is flowing through the control of cryotron 22, thus rendering the gate of cryotron 22 resistive.

To perform the read operation currents are applied to both the digit line and the read line. The magnetic field due to the flow of the read current through the control of cryotron 21 renders the gate of cryotron 21 resistive. Since the gate of cryotron 22 is also resistive due to the stored persistent current, as mentioned above, the digit current encounters resistance in the storage circuit as indicative of a persistent current and therefore a stored "1." The voltage drop due to the encountered resistance may be detected, for example, by a voltage detector 28 connected to the digit line. In this manner a stored "1" can be detected.

The writing and the reading of a "1" has now been described. The third column of FIG. 3 illustrates the writing of a "0" in the storage circuit. It will be recalled that a "0" is represented by the absence of a persistent current in the storage loop. Also readout from the present storage circuit is non-destructive, that is, a persistent current indicative of a "1" is not destroyed by the read operation. This is illustrated in FIG. 3 by the continuance of the loop current. Thus to write a "0" no persistent current is established and any previously established persistent current in the storage loop must be concluded (in the event that a "1" was previously stored in the circuit).

To write a "0" in the storage circuit a current is applied to the write line but no current is applied to the digit line. The write current renders the gate of cryotron 23 resistive and this resistance dissipates any persistent current in the loop as is illustrated by the conclusion of the loop current in the third column of FIG. 3. Thus the absence of a persistent current in the storage circuit is representative of a "0."

The reading or detection of a stored "0" is illustrated in the fourth column of FIG. 3. Digit and read currents are applied to the digit and read lines respectively. The read current through the control of cryotron 21 renders the gate of this cryotron resistive. However, since there is no persistent current in the event of a stored "0," the gate of cryotron 22 is superconducting thus providing a non-resistive path for the applied digit current. This absence of resistance can be detected by the detector 28 as indicative of the stored "0."

An outstanding advantage of the above-described storage circuit is that the digit current is applied in a single direction on a single digit line for both writing and reading thus allowing simplification of selection circuitry. This allows simplification of word registers (not shown) which receive the words to be stored in the memory and for controlling the application of digit currents. This simplification in turn allows the storage of a greater number of bits of information in a given volume. In prior art arrangements either separate write and read digit lines and currents are required or a digit current in one direction is used for writing while a digit current in the opposite direction, although on the same line, is required for reading. The advantages of the present storage circuit will be more apparent from the following description of the memory matrix of the invention.

Figure 4:
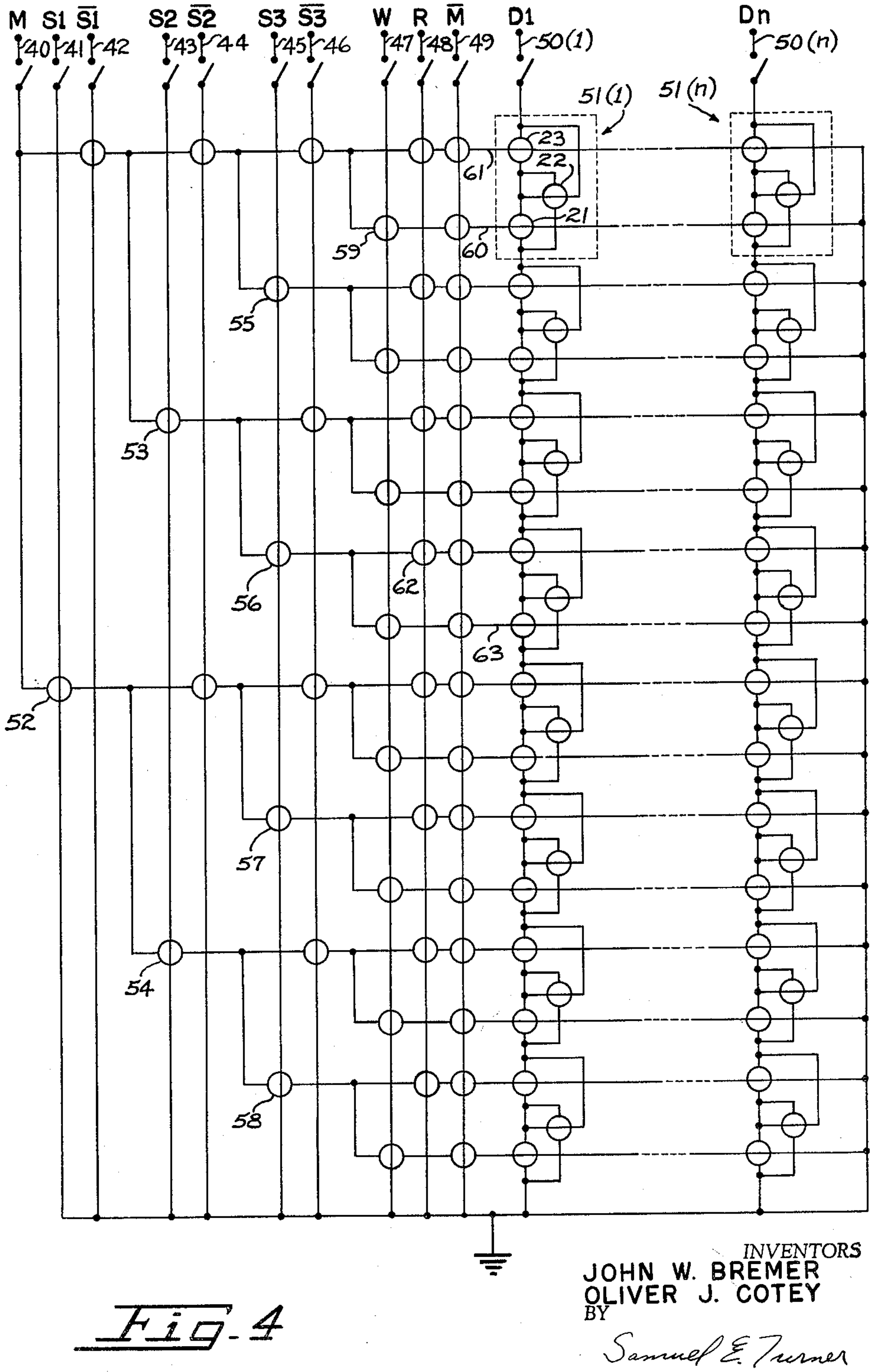
FIGURE 4 is a schematic diagram of an embodiment of a cryogenic memory unit according to the present invention.

An example of a memory matrix according to the invention is illustrated in schematic form in FIG. 4. The memory is formed of rows and columns of the bit storage circuits described hereinbefore. The memory is word-organized, that is, all of the digits or bits of one word are written or read at the same time. Each word corresponds to a row of the storage circuits of FIG. 4. The memory illustrated, by way of example, has a capacity of eight words, each word having any convenient number of digits. The digit positions correspond to the columns of the matrix. Thus in the memory matrix illustrated in FIG. 4, a first word to be stored is contained in a first row of storage circuits including a storage circuit 51(1) in a first bit or digit column and a storage circuit **51(*n*) in the last bit or digit column. To clarify the drawing the intervening storage circuits 51(2)–51(*n*−1) are not shown. The storage circuits in each column are connected in series and to a digit line for receiving digit current during writing and reading operations. For example, the storage circuits of the first column are connected to a digit line 50(1) to which a digit current D1 is applied. Similarly, the last column of storage circuits is connected to a digit line 50(*n*)** to which a digit current D*n* is applied.

For ease of identification, the storage circuits 51(1) and **51(*n*) are enclosed with dotted lines and the same reference numbers are applied to the cryotrons of storage circuit 51(1)** as are applied in FIG. 2.

An arrangement of cryotrons shown to the left of the first column of storage circuits comprises a selection circuit for directing a memory current M applied to a line 40 to the read line or the write line of a selected word or row of storage circuits. The pulses of memory current M are timed in relation to the application of the digit current pulses D1–D*n* to achieve the writing and reading action described hereinbefore in the description of operation of the storage circuit with reference to FIGS. 2 and 3. It is noted that a line 49 contains the controls of a column of cryotrons, one in each of the row lines of the memory. A current $\overline{M}$ is applied to line 49 between operation cycles thus making this row of cryotrons resistive at that time to prevent stray currents in the superconductive circuitry.

The operation of the selection circuit and of the memory as a whole will be better understood from the following examples of selection and writing and reading into and from the memory.

Assume, for example, that it is desired to store a word, that is, write, in the first or upper row of storage circuits. This row of storage circuits is selected by applying a plurality of selection currents S1, S2 and S3 to respective selection lines 41, 43 and 45. These currents render resistive a plurality of selection cryotrons 52–58 thus leaving a super-conducting path for the memory current M to only the first row of storage circuits **51(1)–51(*n*)**.

Digit current pulses D1–D*n* are applied to the digit lines **50(1)–50(*n*) according to the value of the digit to be stored as previously described in the description of operation of the storage circuit, that is, if a "1" is to be stored in the storage circuit 51(1)** for example, the digit current D1 is applied. However, if a "0" is to be stored, the digit current pulse is not applied to that column.

The write operation is controlled by applying a write current pulse W to a write selection line 47. This write current through the control of a cryotron 59 renders a read line 60 resistive and thus a write line 61 is the only row line of the memory matrix which remains superconductive. The memory current M thus flows through the write line 61. As mentioned hereinbefore the memory current pulses (which are equivalent to the write and read current pulses of FIG. 3) are timed with the application of the digit current pulses D1–D*n* to achieve storage action as described in connection with FIGS. 2 and 3. Thus persistent currents are or are not established in the storage circuits **51(1)–51(*n*)** according to whether the respective digit current pulse is applied. Upon termination of the memory current pulse M and the digit current pulses D1–D*n*, the persistent currents in the storage circuit **51(1)–51(*n*) remain to represent stored "1's", the absence of a persistent current in a storage circuit being representative of a stored "0". In this manner a pattern of presence and absence of persistent currents is established in the row of storage circuits 51(1)–51(*n*)** to represent the desired stored word.

As an example of a read operation, assume that it is desired to read a word stored in the fourth row of the memory. To select the fourth row, selection currents S1, $\overline{S2}$ and $\overline{S3}$ are applied to respective selection lines 41, 44 and 46. A read current R is applied to a read selection line 48. Current in read selection line 48 renders a cryotron 62 resistive; thus a read line 63 of the fourth row is the only row line of the memory which remains superconductive.

Digit currents D1–D*n* are now applied to the digit lines **50(1)–50(*n*)** and the memory current pulse M is applied to achieve the reading action as described hereinbefore. If a "1" is stored in a storage circuit of the selected row a persistent current is present and the digit current of the corresponding column encounters a resistance. This resistance can be detected as described hereinbefore in connection with FIG. 2 it being noted that all the storage circuits in a column except a storage circuit in the selected row which is storing a "1" remain superconductive to the digit current. Thus the presence or absence of resistance to the digit currents is indicative of the binary digits of the word stored in the selected row of storage circuits.

Thus the present memory provides word storage and non-destructive readout with relatively simple selection circuitry using relatively few cryotrons.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A memory device comprising: first and second cryotrons with the gates thereof connected in parallel; a third cryotron with the gate thereof connected in series with said parallel connected gates of said first and second cryotrons; and a super-conductive branch circuit connected in parallel with the gate of said third cryotron, a portion of said branch circuit forming the control of said second cryotron.

2. A memory device comprising: first and second cryotrons with the gates thereof connected in parallel; a third cryotron with the gate thereof connected in series with said gates of said first and second cryotrons; a superconductive branch circuit connected in parallel with the gate of said third cryotron, a portion of said branch circuit including the control of said second cryotron; means for applying a digit current to said memory circuit; means for applying a write current to the control of said third cryotron for diverting said digit current to said branch circuit; and means for turning off said write current and said digit current to thereby store a circulating current.

3. A memory device comprising: a normally superconductive loop circuit; means for establishing a circulating current in said loop to represent an item of information; first and second cryotrons with their gates connected in parallel and connected at one end to said loop, said loop including the control of said second cryotron; means for applying a digit current to said loop and said cryotrons; and means for applying a read current to the control of said first cryotron whereby said digit current encounters resistance when a circulating current is present in said loop and encounters a superconductive path through said second cryotron when a circulating current is absent from said loop.

4. A memory matrix comprising: a plurality of storage circuits arranged in rows and columns, each storage circuit comprising first and second cryotrons, means connecting the gates of said first and second cryotrons in parallel, a third cryotron, means connecting the gate of said third cryotron in series with said parallel connected gates of said first and second cryotrons, a superconductive branch circuit connected in parallel with the gate of said third cryotron, said branch circuit including the control of said second cryotron; means connecting the storage circuits of each column in series; means for selectively connecting each column to a source of digit current; a write line for each row of storage circuits, said write line forming the control of said third cryotron of each storage circuit of the corresponding row; a read line for each row of storage circuits, said read line forming the control of said first cryotron of each storage circuit of the corresponding row; and means for selectively applying a memory current to said write and read lines.

5. A storage circuit comprising: a loop circuit forming a closed path for current; selectively operable means for establishing a current in said loop; first and second elements connected in parallel, said parallel connected elements being connected in series with said loop, said loop including means to cause said second element to assume a relatively high resistance state in response to said current in said loop; means for selectively causing said first element to assume a relatively high resistance state; and means for detecting that said first and second elements are in their high resistance state simultaneously to thereby indicate the presence of a current in said loop.

6. A storage circuit comprising: a loop circuit forming a closed path for current; selectively operable means for establishing a storage current in said loop; first and second superconducting elements connected in parallel, said parallel connected elements being connected in series with said loop; means responsive to said storage current for rendering said second superconducting element resistive; selectively operable means for rendering said first superconducting element resistive; means for selectively applying a digit current to said parallel connected elements; and means for detecting the encounter of resistance by said digit current.

7. A storage circuit comprising: first and second superconductive loop circuits connected in series, each loop circuit providing parallel current paths; means for applying a digit current to said series connected loop circuits; a first current controlled resistance means connected in one of the current paths of said first loop; means for applying a write current to said first resistance means for rendering said one current path of said first loop resistive whereby substantially all of said digit current is diverted to the other current path of said first loop; means for removing said digit and write currents whereby a storage current is established in said loop; a second current controlled resistance means in a first path of said second loop, said second resistance means being responsive to a storage current in said first loop to render said first path of said second loop resistive.

8. A memory unit for storing words comprising: a plurality of bit storage circuits arranged in rows and columns, each storage circuit including a current loop for storing a persistent current representative of a given bit of a word and first and second cryotrons with the gates thereof connected in parallel, said current loop including the control of said second gate; means connecting the storage circuits of each column in series; writing means, including means for selectively applying a digit current to each column, for establishing a pattern of persistent currents in a selected row to represent a given word to be stored; and reading means, including means for applying a read current to the control of said first cryotron of each storage circuit of a selected row, and means for applying a digit current to each column in coincidence with said read current.

9. A memory unit for storing words comprising: a plurality of bit storage circuits arranged in rows and columns, each storage circuit including a current loop for storing a persistent current representative of a given item of information, and first and second cryotrons with the gates thereof connected in parallel, said current loop including the control of said second cryotron; means connecting the storage circuits of each column in series; writing means for establishing a pattern of persistent currents in a selected row of said storage circuits to represent a given word to be stored; and reading means including a read line in each row of said storage circuits, said read line including the control of said first cryotron of each storage circuit of the corresponding row, a cryotron controlled superconductive selection circuit operable to selectively direct a memory current through a selected read line, means for applying a digit current through each column of said storage circuits in coincidence with the memory current through said selected read line, and means for detecting the encounter of resistance by the digit currents through said columns to thereby indicate the identity of the word stored in the row corresponding to said selected read line.

10. A storage circuit comprising: series connected first and second superconductive circuits, each of said circuits including respective first and second parallel current paths; means for temporarily applying a digit current to said series connected circuits; means for temporarily rendering resistive said first path of said first circuit for directing substantially all of said digit current through said second path of said first circuit for establishing a storage current in said first circuit; and means responsive to a storage current in said first circuit for rendering resistive said first path of said second circuit.

11. The storage circuit of claim 10 further including means for selectively rendering resistive said second path of said second circuit.

References Cited by the Examiner

UNITED STATES PATENTS

| | | | |
|---|---|---|---|
| 3,043,512 | 7/62 | Buckingham et al. | 340—173.1 |
| 3,086,197 | 4/63 | Anderson | 340—173.1 |

OTHER REFERENCES

Publication: Buck, "The Cryotron—A Superconductive Computer Component," Proceeding of the IRE, 4/56, pages 482–493.

IRVING L. SRAGOW, *Primary Examiner.*